(12) United States Patent
DeFrank et al.

(10) Patent No.: US 8,884,582 B2
(45) Date of Patent: Nov. 11, 2014

(54) BATTERY MANAGEMENT SYSTEM UTILIZING STACKABLE BATTERIES

(75) Inventors: William Jeff DeFrank, Livonia, MI (US); Joseph Richard Bertrand, Canton, MI (US); Albert W. Harrison, III, Detroit, MI (US)

(73) Assignee: ALTe Powertrain Technologies, Inc., Auburn Hills, MI (US)

( * ) Notice: Subject to any disclaimer, the term of this patent is extended or adjusted under 35 U.S.C. 154(b) by 303 days.

(21) Appl. No.: 13/275,503

(22) Filed: Oct. 18, 2011

(65) Prior Publication Data

US 2012/0091962 A1    Apr. 19, 2012

Related U.S. Application Data

(60) Provisional application No. 61/394,513, filed on Oct. 19, 2010.

(51) Int. Cl.
| | |
|---|---|
| *H02J 7/00* | (2006.01) |
| *B60L 11/18* | (2006.01) |
| *H01M 10/44* | (2006.01) |
| *H01M 10/46* | (2006.01) |
| *H01M 10/42* | (2006.01) |

(52) U.S. Cl.
CPC ....... *H01M 10/4207* (2013.01); *B60L 11/1853* (2013.01); *Y02T 10/705* (2013.01); *Y02E 60/12* (2013.01); *H01M 10/441* (2013.01); *H01M 10/46* (2013.01); *H02J 7/0013* (2013.01); *Y02T 10/7005* (2013.01); *Y02T 10/7055* (2013.01)
USPC ............ 320/112; 320/116; 320/107; 320/117

(58) Field of Classification Search
USPC ................................................ 320/112, 120
See application file for complete search history.

(56) References Cited

U.S. PATENT DOCUMENTS

| | | | |
|---|---|---|---|
| 8,212,522 B2 * | 7/2012 | Deal et al. ..................... | 320/116 |
| 2005/0127873 A1 | 6/2005 | Yamamoto et al. | |

FOREIGN PATENT DOCUMENTS

EP      1526601 A1     4/2005

OTHER PUBLICATIONS

PCT Search Report and Written Opinion dated Jan. 17, 2012 for PCT/US2011/058807 filed Oct. 19, 2011.

* cited by examiner

*Primary Examiner* — Drew A Dunn
*Assistant Examiner* — Zixuan Zhou
(74) *Attorney, Agent, or Firm* — Honigman Miller Schwartz and Cohn LLP

(57) ABSTRACT

An energy storage system includes a battery management system that has a plurality of loads connected in electrical series with one another, and a controller operatively connected to the plurality of loads. A first battery pack has battery cells connected in electrical series with respect to one another to establish a system voltage. The first battery pack is connected in electrical parallel to the plurality of loads. The controller is operable to balance charges of the battery cells by activating selected ones of the loads. The battery management system and the first battery pack are configured such that an additional battery pack with additional battery cells connected in electrical series with respect to one another or an additional load pack with additional loads connected in electrical series with respect to one another is connectable to the battery management system. A method of managing battery capacity is also provided.

11 Claims, 4 Drawing Sheets

BATTERY MANAGEMENT SYSTEM UTILIZING STACKABLE BATTERIES

CROSS-REFERENCE TO RELATED APPLICATION

This application claims the benefit of U.S. Provisional Application No. 61/394,513, filed Oct. 19, 2010, which is hereby incorporated by reference in its entirety.

TECHNICAL FIELD

The present disclosure relates to a system and method for managing a battery for a battery-powered vehicle.

BACKGROUND

Advancements in technology and the growing concern for environmentally-efficient vehicles have led to the use of alternate fuel and power sources for vehicles. Electric vehicles or hybrid electric vehicles can use electric motors and energy storage systems (ESS) to provide power for various vehicle requirements. The ESS commonly includes a plurality of battery cells and a battery management system (BMS) to control the charging of the battery cells. The BMS is configured to manage the voltage and capacity required for a particular vehicle in order to control features such as the charging rate, charging balance between individual battery cells, and amount of charge for each battery cell. In addition to ensuring that the battery cells have balanced charge, the BMS also prevents overheating and overcharging of the battery cells.

It may be desirable to alter the capacity of the ESS for a vehicle depending on the desired functions of the vehicle, e.g. to provide increased range. However, altering the capacity of the ESS may affect several factors, including the charging rates of the battery cells. Heretofore, if the capacity of ESS is to be changed, a newly configured BMS has been required in order to accommodate the altered charging rates and prevent overheating and overcharging of the battery cells. Alternatively, if full battery packs are added in parallel, each battery pack must contain its own redundant BMS.

SUMMARY

An energy storage system includes a battery management system that has a plurality of loads connected in electrical series with one another; and a controller operatively connected to the plurality of loads. A first battery pack has battery cells connected in electrical series with respect to one another to establish a system voltage. The first battery pack is connected in electrical parallel to the plurality of loads. The controller is operable to balance charges of the battery cells by activating selected ones of the loads. As used herein "activating" a load means causing the load to be applied to the respective battery cell to which it is connected in parallel. For example, if the load is a resistor, the controller activates the load by turning on the resistor so that it dissipates energy from the battery cell. The battery management system and the first battery pack are configured such that at least one of an additional battery pack with additional battery cells connected in electrical series with respect to one another and an additional load pack with additional loads connected in electrical series with respect to one another is connectable to the battery management system. The controller is further operable to balance charges of the additional battery cells of the additional battery pack when the additional battery pack is connected. The controller is also operable to activate the additional loads of the additional load pack when said additional load pack is connected. In this manner, a load to capacity ratio of the energy storage system is kept within a predetermined range, even when capacity is added (by adding additional battery packs) or load is added (by adding additional load packs). Furthermore, the same battery management system is used. That is, the same controller controls the added battery packs and load packs.

A method of managing battery capacity includes connecting a load pack and a battery pack in electrical parallel with respect to one another and in operative connection with a controller. The method further includes connecting at least one of an additional battery pack and an additional load pack to external electrical connectors of the first load pack and the first battery pack such that the at least one of an additional battery pack and an additional load pack are in operative connection with the controller. The controller then controls a total load of the load pack and the additional load pack to a total capacity of the battery pack and the additional battery pack within a predetermined ratio range with respect to one another. By providing the external connectors on the first load pack and the first battery pack, series connected battery cells can easily be placed in parallel with other series connected battery cells, and series connected loads can easily be placed in parallel with the battery cells and other series connected loads. Accordingly, capacity may be added to or removed from a battery system for use in different vehicles, increasing versatility in manufacturing, or capacity may be added or removed to change the battery capacity of a battery during the life of a given vehicle as a vehicle owner's needs change, such as if expected driving patterns change. By enabling a load pack to be stacked in parallel to an existing ESS, the BMS can be tuned to an application by increasing or decreasing the total load. This in turn may increase or decrease the time required to achieve battery balance.

The above features and advantages, and other features and advantages of the present invention will be readily apparent from the following detailed description of the preferred embodiments and best modes for carrying out the invention when taken in connection with the accompanying drawings and appended claims.

DETAILED DESCRIPTION

Figure 1:
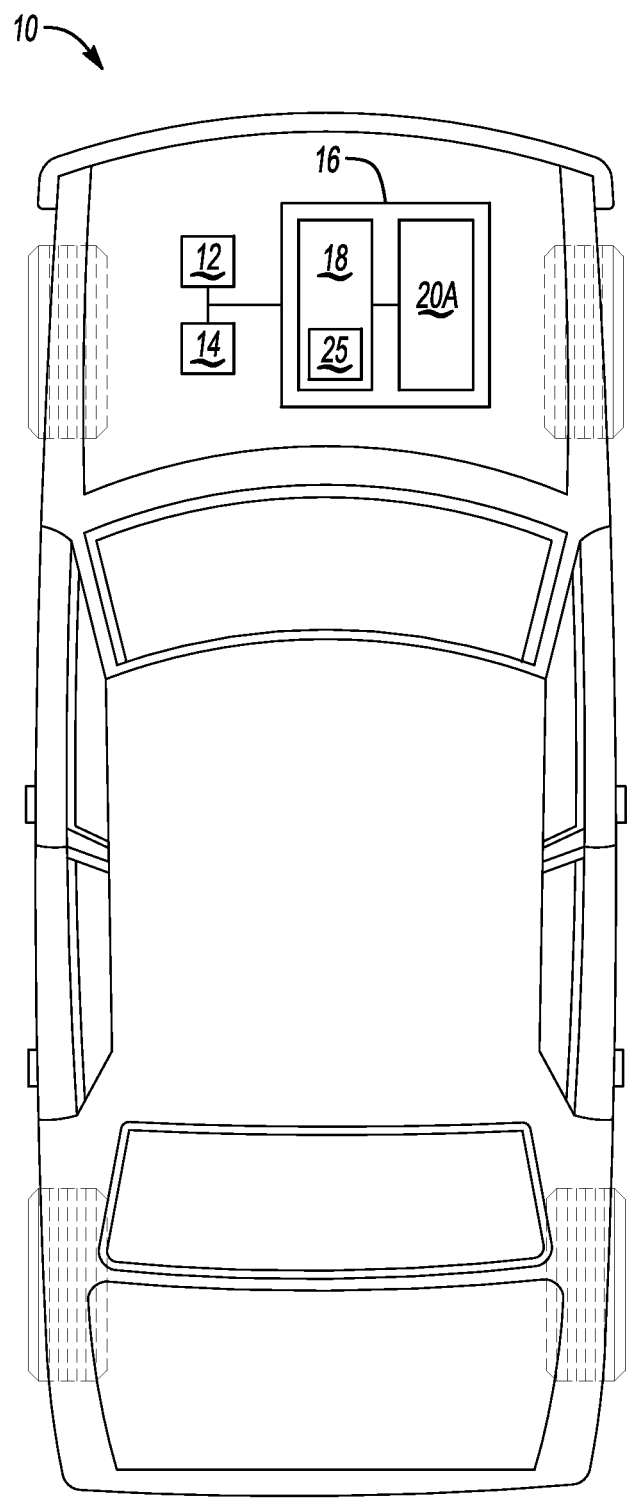
FIG. 1 is a schematic plan view illustration of an electric vehicle having an energy storage system and a battery management system.
Figure 2:
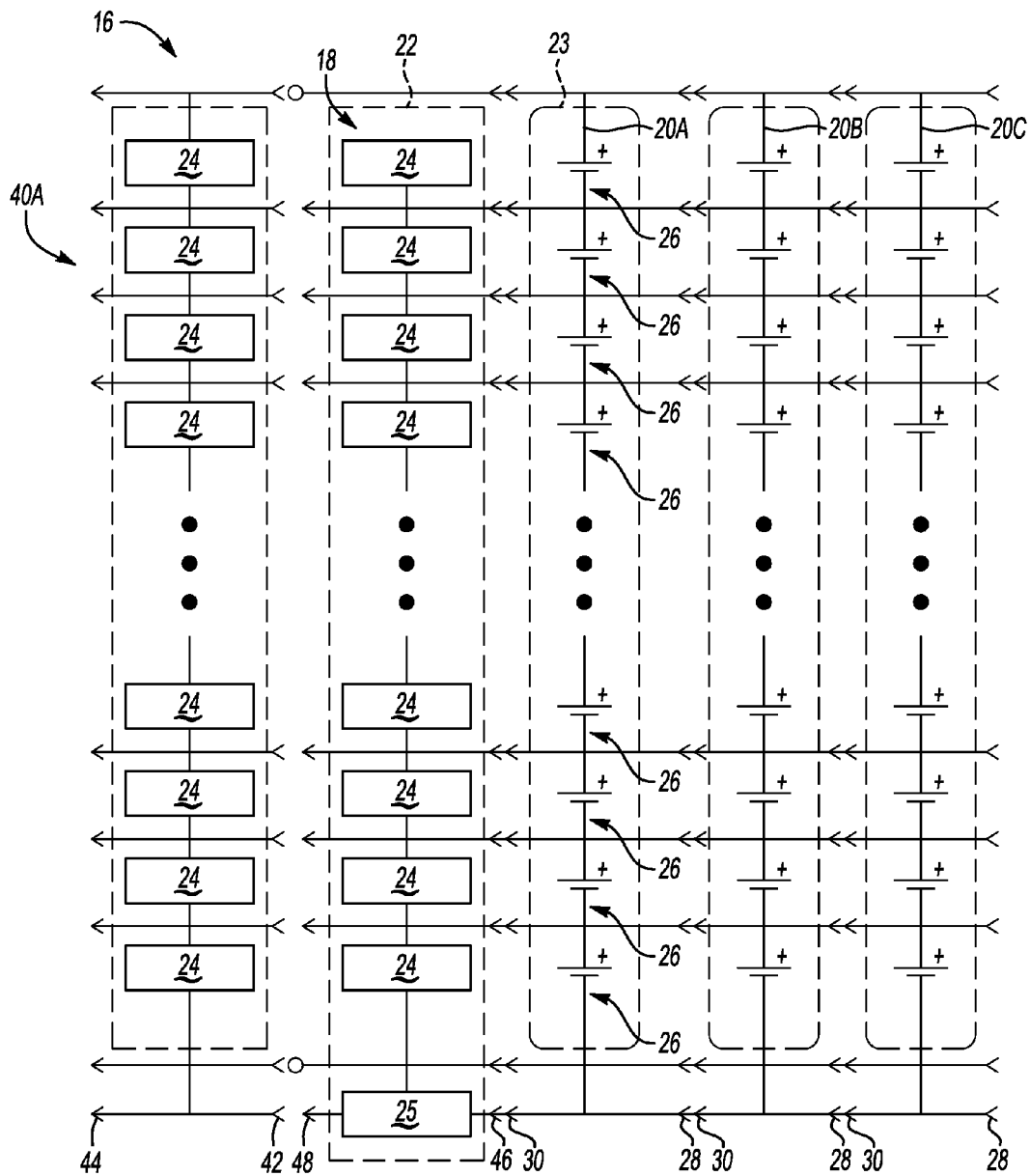
FIG. 2 is a schematic illustration of a first embodiment of an energy storage and battery management system for the vehicle of FIG. 1.

Referring to the drawings, wherein like reference numbers refer to the same or similar components throughout the several views, FIGS. 1 and 2 schematically illustrate a vehicle 10 including at least one fraction motor 12, a transmission or gear drive 14, and an energy storage system (ESS) 16. The motor 12 may be a motor/generator, e.g. a multi-phase AC induction-type machine, and the ESS 16 may provide power to drive the motor 12 or store power generated by the motor 12 as the vehicle 10 operates. An inverter (not shown) may be connected between the motor 12 and the ESS 16. The ESS 16 includes a battery management system (BMS) 18 and at least a first battery pack 20A.

The BMS 18 is located within a housing 22. In the embodiment shown in FIG. 2, the first battery pack 20A is located within a separate housing 23. The BMS 18 includes a controller 25 that may be located within the housing 22. Fluid conduits (not shown) for cooling the first battery pack 20A and the BMS 18 may be defined by or contained within the housings 22, 23

Figure 3:
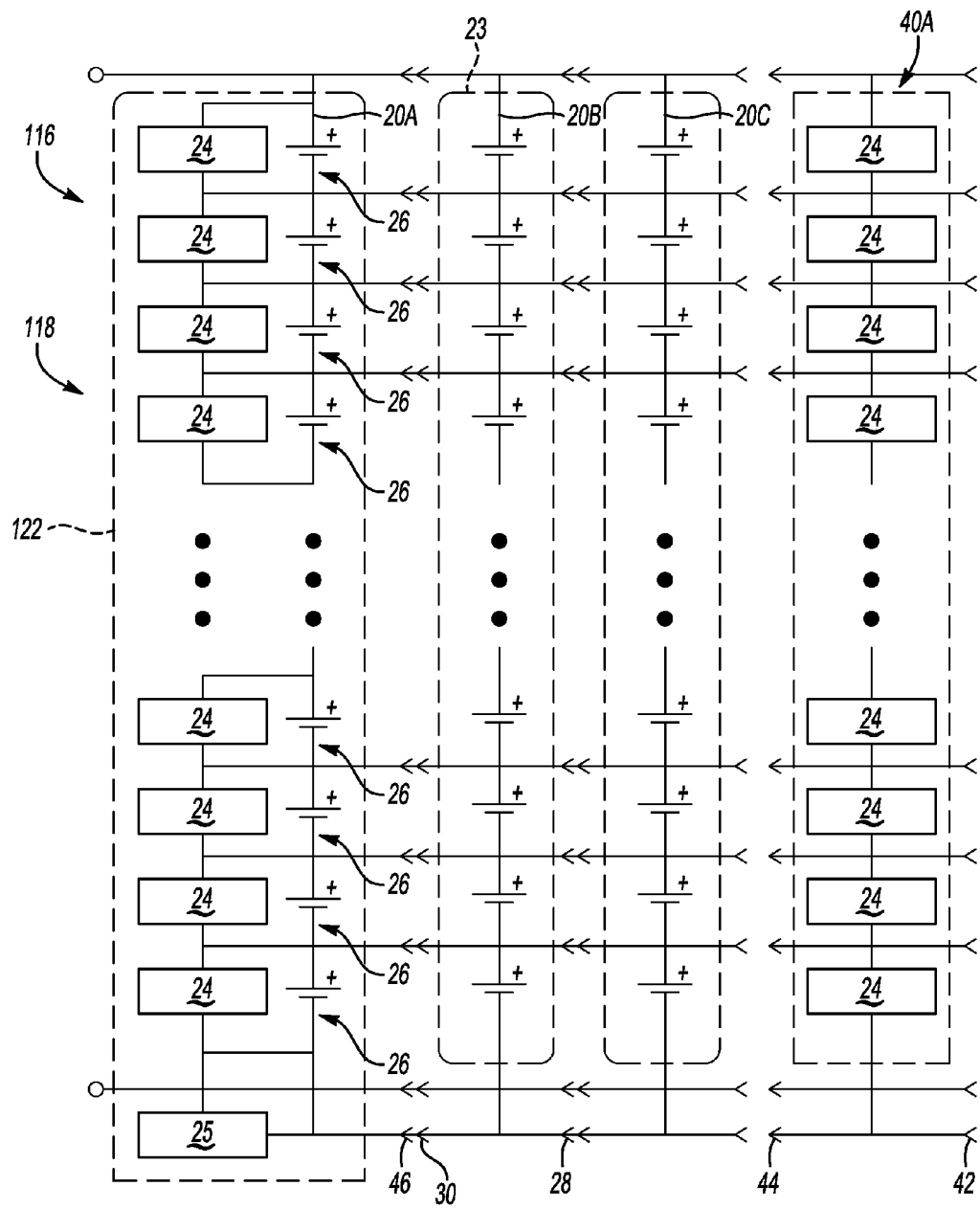
FIG. 3 is a schematic illustration of a second embodiment of an energy storage and battery management system for the vehicle of FIG. 1.

The BMS 18 also includes a plurality of loads 24 that are connected in electrical series with one another and may be referred to as a load pack. The first battery pack 20A has a plurality of battery cells 26 that are connected in electrical series with one another. By placing the loads 24 in a separate housing 22 from the battery cells 26, dissipated heat is removed from the vicinity of the battery cells 26. By removing the controller 25 from any and all of the battery packs 20A-20C, the battery packs may be referred to as "dumb". In comparison, battery pack 20A of FIG. 3 is within the same housing 122 as the controller 25 and may be referred to as a "smart" battery pack.

The battery pack 20A is connected to the BMS 18 in such a manner that each individual load 24 of the BMS 18 is connected in electrical parallel with a respective individual battery cell 26 of the battery pack 20A, as illustrated in FIG. 2. The number and size of the battery cells 26 determines the voltage of the BMS 18 and are selected based on a desired voltage. The number and size of the loads 24 are designed based on the capacity of the pack 20A (and additional packs), the desired charge for each battery cell 26 that is to be balanced by the BMS 18, and the desired charging rate. Additional battery packs 20B, 20C, having the same configuration and voltage as the first battery pack 20A, may be connected in electrical parallel to the first battery pack 20A and the BMS 18. For example, each additional battery pack 20B, 20C may have a housing 23 and connectors 28, 30 identical to those of battery pack 20A.

Connecting the battery packs 20A, 20B, 20C in electrical parallel with respect to one another allows the battery packs 20A, 20B, 20C to share a single BMS 18. That is, the battery packs 20A, 20B, 20C are balanced by a single BMS 18 with a single controller 25. The controller 25 of the BMS 18 has a processor with a stored algorithm that determines the capacities of the individual battery cells 26 and rebalances the battery cells 26 and/or controls the rate of charge of the battery cells 26 by activating selected ones of the individual loads 24. The individual loads 24 may be bleed resistors each able to apply a load to the battery cell or cells 26 with which the individual load 24 is connected in parallel when activated by the controller 25. Alternatively, each individual load 24 may be a variable resistor. The BMS 18 is configured to manage the voltage and capacity required for a particular vehicle in order to control features such as the charging rate, charging balance between individual battery cells 26, and the amount of charge for each battery cell 26. In addition to ensuring that the battery cells 26 have balanced charge, the BMS also prevents overheating and overcharging of the battery cells 26.

The number of battery packs 20A-C connected to the BMS 18 ultimately determines the capacity of the ESS 16. The embodiment shown illustrates first battery pack 20A, second battery pack 20B, and third battery pack 20C. However, if additional capacity is required, one or more battery packs similar to battery packs 20A-C may be connected in electrical parallel, in a similar manner as shown and described below.

The BMS 18 includes a connector 46 matable with a connector 30 of the battery pack 20A. Each battery pack 20A-C may include a first connector 28 and a second connector 30. The BMS connector 46 is a female connector and the connector 30 is a male connector. Alternatively, the BMS 18 may have a male connector matable with a female connector of the battery pack 20A. The BMS 18 also has a connector 48, which may be a male type connector and may be the same type as the connector 30. Multiple electrical connectors 46 and 30 are schematically shown (although only one of each is numbered). However, in some embodiments, there may be only one physical connector on the battery pack 20A that connects with only one connector on the BMS 18. In other embodiments, the battery packs 20A, 20B, 20C are connected in parallel, but are not physically connected housings, and so need not be adjacent one another.

The battery packs 20B and 20C may each have the same first and second connectors 28, 30 as the first battery back 20A. The first and second connectors 28 and 30 may be in the same location on each battery pack 20A-C. For example, with reference to FIGS. 2 and 4, the first connector 28 may be a female connector and the second connector 30 may be a male connector. A first connector 28 on the first battery pack 20A may align with a second connector 30 on a second battery pack 20B. By providing common connectors 28 and 30 on the battery packs 20A-20C, additional battery packs 20A-C may be easily added or removed as is desired to obtain a particular capacity for the ESS 16, such as for a particular vehicle 10 or in order to modify the capacity of the ESS 16 during the life of the vehicle 10.

Figure 4:
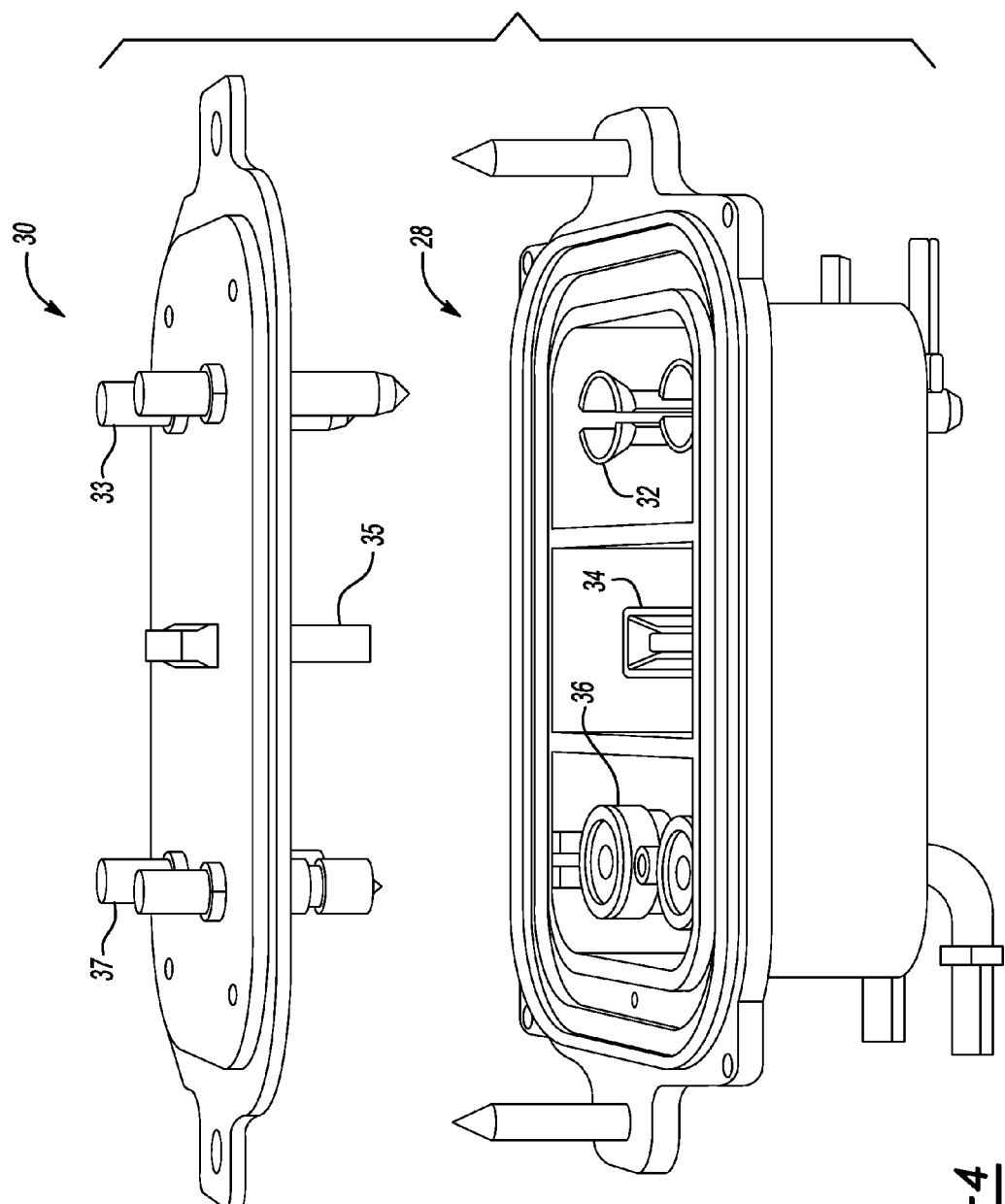
FIG. 4 is a schematic perspective view of a first embodiment of complementary connectors for the battery management system of FIGS. 1-3.

The connectors 28 and 30 may also establish all of the types of connections that are required for a particular battery style associated with the ESS 16. For example, the connectors 28 may provide for communication between the battery packs 20A, 20, 20C of battery power, coolant line and data connections required for operating the battery cells 26. FIG. 4 shows the connectors 28, 30 in greater detail. The first connector 28 includes a first high-voltage connector 32, a first general electrical connector 34, and a first fluid connector 36, each of which is a female type connector. Likewise the second connector 30 includes a second high-voltage connector 33, a second general electrical connector 35, and a second fluid connector 37, each of which is a male type connector. The first and second high-voltage connectors 32 and 33 are matable, the general electrical connectors 34 and 35 are matable, and the fluid connectors 36 and 37 are matable to together establish all of the operative connections between the battery packs 20A-20C that are required for the battery packs 20A-C to be operatively electrically and fluidly connected with one another. The fluid connectors 36 and 37 may allow the additional battery packs 20B-C to receive cooling fluid from the vehicle 10 from the same conduits as does the battery pack 20A without requiring additional complicated conduits. The required fluid conduits (not shown) may be formed in the housings 22 of the individual battery packs 20A-C. Alternatively, in order to provide more flexible packaging of the ESS 16 within the vehicle 10, connecting conduits (not shown) may be used between the first connector 28 and the second connector 30 such that the battery packs 20A-C are not required to be positioned physically adjacent to one another.

The controller 25 shown in FIG. 2 maintains charging and cooling of the battery cells 26 at the desired rate. To maintain the desired rate of charging, the total amount of load 24 (i.e., the total load established by all of the loads 24) available to the BMS 18 may need to be adjusted as battery packs 20A-C are added. Additional load 24 may be added to the BMS 18 by adding on at least an additional load pack 40A. The load pack 40A includes a pair of load connectors 42 and 44 extending from the load pack 40A that are configured substantially identically to the connectors 28 and 30, respectively, on the battery packs 20A-C and which operate in a similar manner. That is, the connector 42 may be identical to the connector 28 shown in FIG. 4, and the connector 30 may be identical to the connector 44 shown and described in FIG. 4. The connector 42 may be used to attach the additional load pack 40A directly to the BMS 18. In this instance, connectors 48 extending from the BMS 18 may be used to connect the load pack 40A. Alternatively, the connector 44 may be used to connect the load pack 40A to connector 28 of the last battery pack 20C (i.e., the battery pack 20C exposed on an end of the ESS 116) that is attached to the BMS 18 (as illustrated in the embodiment shown in FIG. 3). The load pack 40A may include a plurality of individual loads 24 that are arranged in electrical series with one another and provide the same amount of resistance as the total of the individual loads 24 in the first housing 22.

The ratio of the total load of the individual loads 24 connected in series to the total capacity of the battery cells 26 of the different battery packs 20A-20C connected in series (i.e., left to right in FIGS. 2 and 3) determines how quickly the battery packs 20A-C may be balanced. If the number of individual loads 24 compared to the number of battery cells 26 is too low, the BMS 18 will not be able to balance the battery cells 26 quickly enough, or maintain even usage of the battery cells 26. However, too many individual loads 24 may add unnecessary size and expense to the ESS 16. Because the ESS 16 is configured so that additional capacity in the form of individual battery packs 20A-C and additional load in the form of one or more load packs 40A may be added, a ratio of load to capacity can be maintained or modified without requiring an additional BMS to be added and without requiring the BMS 18 to be replaced with a different BMS to adjust for the capacity. Additionally, common connectors 28, 30, 42 and 44 allow the individual battery packs 20A-C and load packs 40A to be quickly and easily installed and removed from the ESS 16. By maintaining the proper ratio of load to capacity, the controller 25 may continue to accurately modulate the charging and usage of the BMS 18 without requiring reprogramming as additional battery packs such as battery packs 20B-C and load packs such as load pack 40A are added or removed.

The ratio of load to capacity may vary as long as the ratio of load to capacity stays within a predetermined range for a particular BMS 18. The capacity of battery cells is typically indicated with a measure of Amp-hours, and a cell-specific voltage versus state of charge curve, assuming a light load or no load on the cell. The capacity of a battery pack is typically indicated in units of energy, such as kW-hours, which can be derived from each cell's Amp-hour measurement and its voltage versus state of charge curve. For example, a load that draws 1 Amp may require 10 hours to balance a fully imbalanced 10 Amp-hour battery pack. The same load drawing 1 Amp would then require 20 hours to balance a fully imbalanced 20 Amp-hour battery pack. By modifying the load, such as by adding one or more load packs 40A, a load that draws 2 Amps can be used with the same BMS 18 so that the BMS 18 will only require 10 hours to balance the 20 Amp-hour pack, the same amount of time that was required to balance the 10 Amp-hour battery pack. The ESS 16 may then be reconfigured by adding battery cells 20B, 20C, etc. and/or adding load packs 40A, etc. so that a load to capacity ratio is achieved that can balance the batteries packs 20A-C within a reasonable time without causing secondary issues that limit the balance current. In this manner, the total capacity of the ESS 16 may be increased without affecting balancing time and without requiring a different BMS 18.

FIG. 3 schematically illustrates another embodiment of an energy storage system (ESS) 116 for use with the vehicle 10 of FIG. 1 in place of ESS 16 shown in FIG. 2. The ESS 116 includes a battery management system (BMS) 118 and a first battery pack 20A. The BMS 118 includes a controller 25 located within a housing 122. In the embodiment shown in FIG. 3, the BMS 118 is embedded with the first battery pack 20A in the same housing 122. Fluid conduits (not shown) for cooling the first battery pack 20A and the BMS 118 may be defined by or contained within the housing 122.

The BMS 118 includes a connector 46 as described above for attaching the additional battery packs 20B-C, and each battery pack 20B-C may include a first connector 28 and a second connector 30 as described above. In FIG. 3, one or more of the battery packs 20B, 20C and one or more load packs 40A are added to achieve a desired load to capacity ratio. In FIG. 3, the load pack 40A is connected to the battery pack 20A instead of the housing 122 that houses the controller 25.

While specific modes for carrying out the invention have been described in detail, those familiar with the art to which this invention relates will recognize various alternative designs and embodiments for practicing the invention within the scope of the appended claims.

The invention claimed is:

1. An energy storage system comprising:
a battery management system including:
a plurality of loads connected in electrical series with one another;
and a controller operatively connected to the plurality of loads;
a first battery pack including battery cells connected in electrical series with respect to one another to establish a system voltage, wherein the first battery pack is connected in electrical parallel to the plurality of loads;
wherein the controller is operable to balance charges of the battery cells by activating selected ones of the loads;
wherein the battery management system and the first battery pack are configured such that at least one of (a) an additional battery pack with additional battery cells connected in electrical series with respect to one another, and (b) an additional load pack with additional loads connected in electrical series with respect to one another, is connectable to the battery management system; and
wherein the controller is further operable to balance charges of the additional battery cells of the additional battery pack when the additional battery pack is connected and is operable to activate the additional loads of the additional load pack when the additional load pack is connected, wherein said at least one of the additional battery pack and the additional load pack are connected to the battery management system to maintain a ratio of a total load on the battery cells of the first battery pack and the battery cells of the additional battery pack to a total capacity of the cattery cells of the first battery pack and the battery cells of the additional battery pack within a predetermined ratio range.

2. The energy storage system of claim 1, further comprising:
a first housing; wherein the plurality of loads and the first battery pack are located in the first housing; and
a second housing connected to the first housing; wherein one of the additional battery pack and the additional load pack are located in the second housing.

3. The energy storage system of claim 1, wherein the first battery pack and the plurality of loads are connected to one another via complementary connectors each of which includes at least one of a high voltage connector, a general electrical connector, and a fluid connector such that electrical and cooling requirements of the first battery pack and the loads are provided through the complementary connectors.

4. The energy storage system of claim 1, wherein the battery management system, the additional battery pack, and the additional load pack are each housed in a separate respective housing that supports complementary connectors at the same location on each of the respective housings to permit connection of the battery management system, the additional battery pack and the additional load pack.

5. An energy storage system comprising:
 a load pack having a plurality of loads connected in electrical series with respect to one another;
 at least one battery pack having a plurality of battery cells connected in electrical series with respect to one another, wherein said plurality of battery cells of said at least one battery pack is connected in electrical parallel with said plurality of loads of said at least one load pack;
 a controller operatively connected to said plurality of loads and operable for managing charging and usage of said plurality of battery cells;
 wherein the load pack and said at least one battery pack each include at least one connector; and
 at least one of an additional battery pack and an additional load pack having at least one complementary connector connectable to said at least one connector so that said at least one of an additional battery pack and an additional load pack is operatively connectable in parallel with the load pack and with said at least one battery pack, and is operatively connected to the controller when said at least one connector is connected with said at least one complementary connector, wherein the controller is operable to rebalance charges of the battery cells to maintain a ratio within a predetermined ratio range; wherein the ratio is a total capacity of the battery cells of said at least one battery pack and battery cells of the additional battery pack to a total load of said plurality of loads of said at least one load pack and loads of the additional load pack on the cattery cells.

6. The energy storage system of claim 5, further including a housing; wherein the load pack, the controller and said at least one battery pack are located in the housing to establish a battery management system.

7. The energy storage system of claim 5, further including:
 a first housing supporting said at least one connector of the load pack; wherein the load pack and the controller are located in the first housing to establish a battery management system; and
 a second housing supporting said at least one connector of said at least one battery pack; and wherein said at least one battery pack is located in the second housing.

8. The energy storage system of claim 5, wherein the load pack, the additional battery pack, and the additional load pack are each housed in a separate respective housing that supports complementary connectors at the same location on each of the respective housings to permit connection of the load pack, the additional battery pack and the additional load pack.

9. The energy storage system of claim 8, wherein each of the complementary connectors includes at least one of a high voltage connector, a general electrical connector, and a fluid connector such that electrical and cooling requirements of said at least one battery pack and the loads are provided through the complementary connectors.

10. A method of managing battery capacity comprising:
 connecting a load pack and a battery pack in electrical parallel with respect to one another and in operative connection with a controller; and
 connecting at least one of an additional battery pack and an additional load pack to electrical connectors of the load pack and the battery pack such that said at least one of an additional battery pack and an additional load pack are in operative connection with the controller; and
 controlling a total load of the load pack and the additional load pack to a total capacity of the battery pack and the additional battery pack within a predetermined ratio range via the controller.

11. The method of claim 10, wherein connecting at least one of the additional battery pack and the additional load pack includes connecting complementary external connectors of said at least one of the additional battery pack and the additional load pack to the external connectors of the load pack and the battery pack.

* * * * *

UNITED STATES PATENT AND TRADEMARK OFFICE
CERTIFICATE OF CORRECTION

PATENT NO. : 8,884,582 B2  
APPLICATION NO. : 13/275503  
DATED : November 11, 2014  
INVENTOR(S) : De Frank et al.

Page 1 of 1

It is certified that error appears in the above-identified patent and that said Letters Patent is hereby corrected as shown below:

In the claim

Column 7, Claim 5, line 44, "cattery" should be changed to -- battery --

Signed and Sealed this
Twenty-fourth Day of March, 2015

Michelle K. Lee
*Director of the United States Patent and Trademark Office*